(12) United States Patent
Steiner

(10) Patent No.: US 8,005,181 B1
(45) Date of Patent: Aug. 23, 2011

(54) CLOCK AND CLOCK ADJUSTMENT CIRCUIT FOR MINIMUM JITTER

(75) Inventor: Glenn C. Steiner, Los Altos, CA (US)

(73) Assignee: Xilinx, Inc., San Jose, CA (US)

( * ) Notice: Subject to any disclaimer, the term of this patent is extended or adjusted under 35 U.S.C. 154(b) by 1179 days.

(21) Appl. No.: 10/970,968

(22) Filed: Oct. 22, 2004

(51) Int. Cl.
*H03D 3/24* (2006.01)

(52) U.S. Cl. ........................................................ 375/373

(58) Field of Classification Search .................. 375/355, 375/373; 326/93; 327/156
See application file for complete search history.

(56) References Cited

U.S. PATENT DOCUMENTS

| | | | |
|---|---|---|---|
| 6,285,726 B1 * | 9/2001 | Gaudet | 375/376 |
| 6,525,578 B2 * | 2/2003 | Ooishi | 327/156 |
| 6,545,507 B1 * | 4/2003 | Goller | 326/93 |
| 6,812,731 B1 * | 11/2004 | Trimberger | 326/10 |
| 7,127,017 B1 * | 10/2006 | Evans et al. | 375/355 |
| 2002/0140472 A1 * | 10/2002 | Sonobe | 327/158 |
| 2002/0154723 A1 * | 10/2002 | Nakamura | 375/376 |
| 2005/0278131 A1 * | 12/2005 | Rifani et al. | 702/79 |

\* cited by examiner

*Primary Examiner* — Dac Ha
*Assistant Examiner* — Tanmay Shah
(74) *Attorney, Agent, or Firm* — Tim Markison; Robert M. Brush; LeRoy D. Maunu

(57) ABSTRACT

A method for adjusting a clock for a jitter sensitive circuit begins by determining a low noise phase region of a primary clock. The method then continues by adjusting phase of an auxiliary clock such that a transition of the auxiliary clock falls within the low noise phase region of the primary clock to produce an adjusted auxiliary clock.

22 Claims, 9 Drawing Sheets clock and clock adjustment circuitry 20 clock and clock adjustment circuitry 20 clock and clock adjustment circuitry 20 phase adjustment module 24 no jitter example of operation of phase adjust
module 24 for a 0° phase position jitter example of operation of phase adjust module 24 for a 0° phase position adjust module 56 function noise profile

CLOCK AND CLOCK ADJUSTMENT CIRCUIT FOR MINIMUM JITTER

BACKGROUND OF THE INVENTION

1. Technical Field of the Invention

The present invention relates generally to mixed signal circuitry and more particularly to providing a clock, which has a rising or falling edge during low noise periods, to jitter sensitive circuits.

2. Description of Related Art

FIG. 1 is a diagram of a buffer and corresponding ideal and actual signaling waveforms. As shown, the buffer has an input that receives a clock input signal and a corresponding output that produces a clock output signal. In an ideal signaling situation, the clock signal input transitions from a logic 0 to a logic 1 instantaneously (i.e., has zero transition times). The clock output signal also includes zero transition time for the ideal signaling but delayed slightly due to propagation delay of the buffer.

As is generally know in the art, digital circuitry, analog circuitry and mixed signal circuitry, especially when implemented on an integrated circuit do not exhibit ideal signaling. In practice, such circuits have a measurable transition time between logic 1 states and logic 0 states. In addition, as shown in the actual signaling, due to the non-zero transition times, and the imperfections of the components comprising the circuitry, jitter results in the signal. As is known, jitter sensitivity to a clock signal limits the ability of circuitry that utilizes the clock signal to accurately perform its function. As is further known, as the speed of signal processing increases, jitter and control thereof becomes an increasing challenge.

To date many approaches have been utilized to reduce jitter including decreasing rise and fall times of signals, improving stability of voltage levels, tightening input thresholds for logic devices, reducing sensitivity of input thresholds due to logic voltage variations, utilizing differential signaling, and isolation of critical logic elements from neighboring noise generating elements. While each of these techniques improves performance by reducing jitter, the jitter is not fully eliminated.

As the demand for higher data rates continues, further reduction in jitter is needed. Therefore, a need exists for a method and apparatus of a clock and clock adjustment circuit for minimum jitter.

BRIEF SUMMARY OF THE INVENTION

The clock and clock adjustment circuit for minimum jitter of the present invention substantially meets these needs and others. In one embodiment, a method for adjusting a clock for a jitter sensitive circuit begins by determining a low noise phase region of a primary clock. The method then continues by adjusting phase of an auxiliary clock such that a transition of the auxiliary clock falls within the low noise phase region of the primary clock to produce an adjusted auxiliary clock.

In another embodiment, a clock and clock adjustment circuit for minimum jitter includes a clock module, and a phase adjustment module. The clock module produces a primary clock and an auxiliary clock. The phase adjustment module is operably coupled to determine a low noise phase region of the primary clock. The phase adjustment module is further operably coupled to adjust phase of the auxiliary clock such that a transition of the auxiliary clock falls within the low noise phase region of the primary clock to produce an adjusted auxiliary clock.

DETAILED DESCRIPTION OF THE INVENTION

Figure 2:
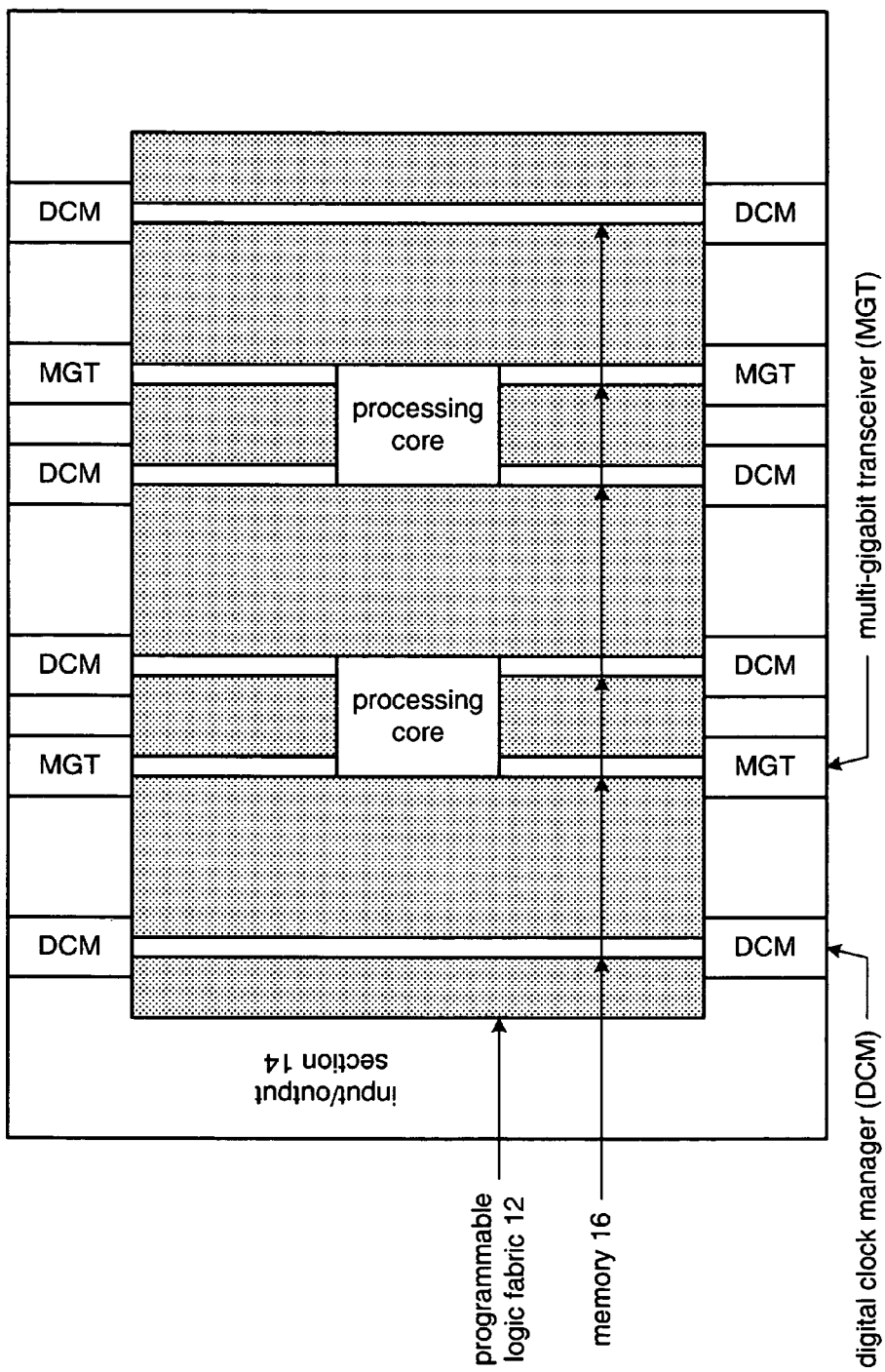
FIG. 2 is a schematic block diagram of a programmable logic device in accordance with the present invention.

FIG. 2 is a schematic block diagram of a programmable logic device 10 that includes programmable logic fabric 12, an input/output section 14, and memory 16. The programmable logic fabric 12 may include one or more processing cores and programmable logic circuitry. Such programmable logic circuitry may include programmable logic arrays (PLA), programmable array logic (PAL) devices, erasable programmable logic devices (EPLD) and/or programmable gate arrays (PGA). The memory 16 may be block random access memory (BRAM). The input/output section 14 may include a plurality of digital clock managers (DCM) and a plurality of multi-gigabit transceivers (MGT).

The digital clock managers (DCM) provide various clock signals to the programmable logic fabric 12 and may further provide clock signals to the multi-gigabit transceivers. In addition, the DCM may provide clock signals to memory, or other input/output modules, for double data rate and quad data rate accesses. The multi-gigabit transceivers, which may include one or more clock circuits, provide digital interfaces for the programmable logic fabric 12 to exchange data with components external to the programmable logic device 10. In general, the multi-gigabit transceivers provide serial to parallel conversion of received serial data and provide parallel to serial conversions for outgoing data.

Figure 1:
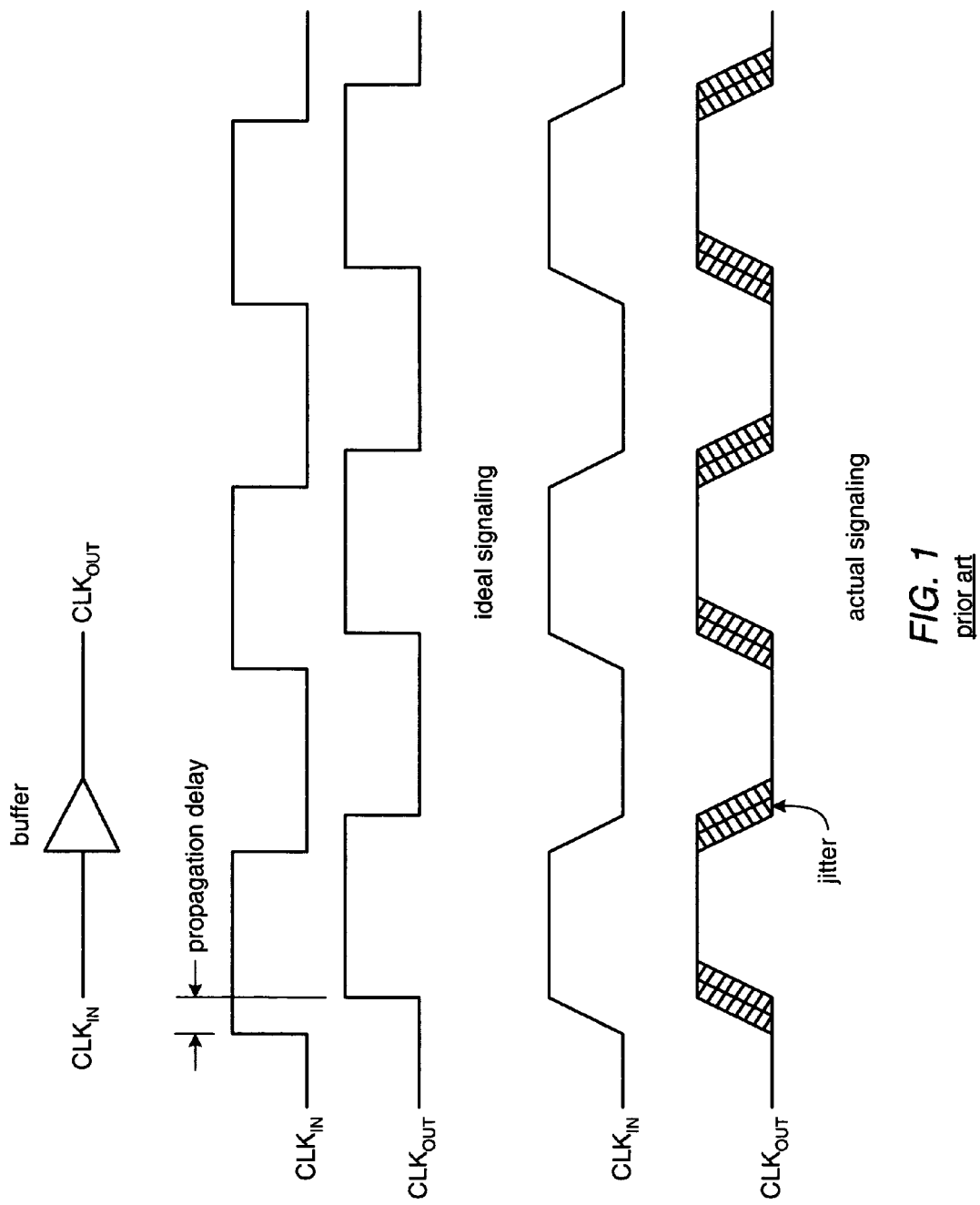
FIG. 1 is a prior art diagram of ideal and actual clock signaling of a buffer.
Figure 3:
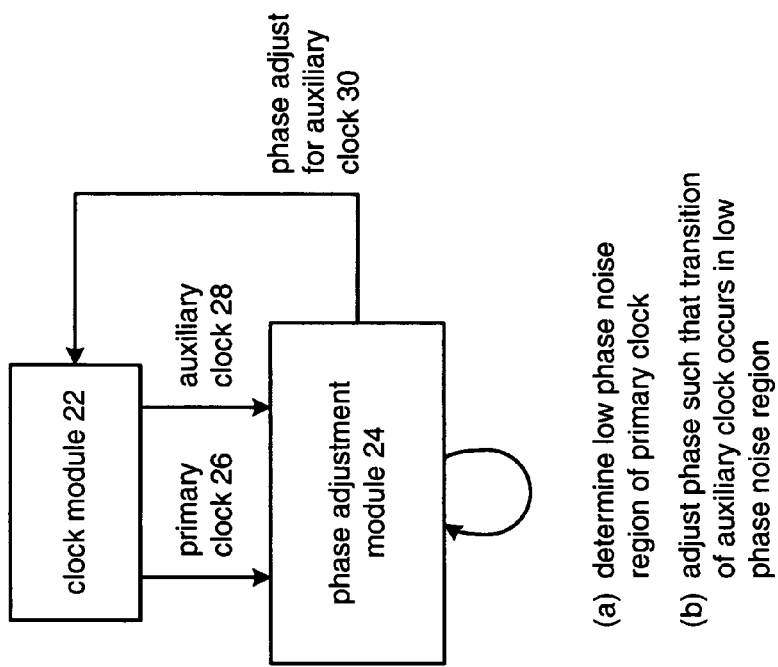
FIG. 3 is a schematic block diagram of a clock and clock adjustment circuit for minimum jitter in accordance with the present invention.

FIG. 3 is a schematic block diagram of a clock and clock adjustment circuitry 20 that may be implemented within the DCM block, MGT block, another block within the programmable logic device of FIG. 1, or may be a stand-alone clock circuit as utilized in any integrated circuit that requires a clock. The low noise clock circuit 20 includes a clock module 22 and a phase adjustment module 24.

The clock module 22 generates a primary clock 26 and an auxiliary clock 28. The auxiliary clock 28 may be synchronous with the primary clock and have a rate equal to the rate of the primary clock, a rate that is a fraction of the rate of the primary clock, and/or have a rate that is a multiple of the rate of the primary clock.

The phase adjust module 24 receives the primary clock 26 and auxiliary clock 28. The phase adjust module 24 performs an algorithm to determine a low noise phase region of the primary clock. This will be described in greater detail with reference to FIGS. 4-10. The phase adjustment module 24 then adjusts the phase of the auxiliary clock 28 via a phase adjust signal 30 such that the transitions of the auxiliary clock occur within the low noise phase region of the primary clock 26. This functionality will be described in greater detail with reference to FIGS. 4-10. As such, the auxiliary clock, which may be used to clock jitter sensitive circuits, produces less jitter and thus provides a low jitter clock signal to the jitter sensitive circuits.

Figure 4:
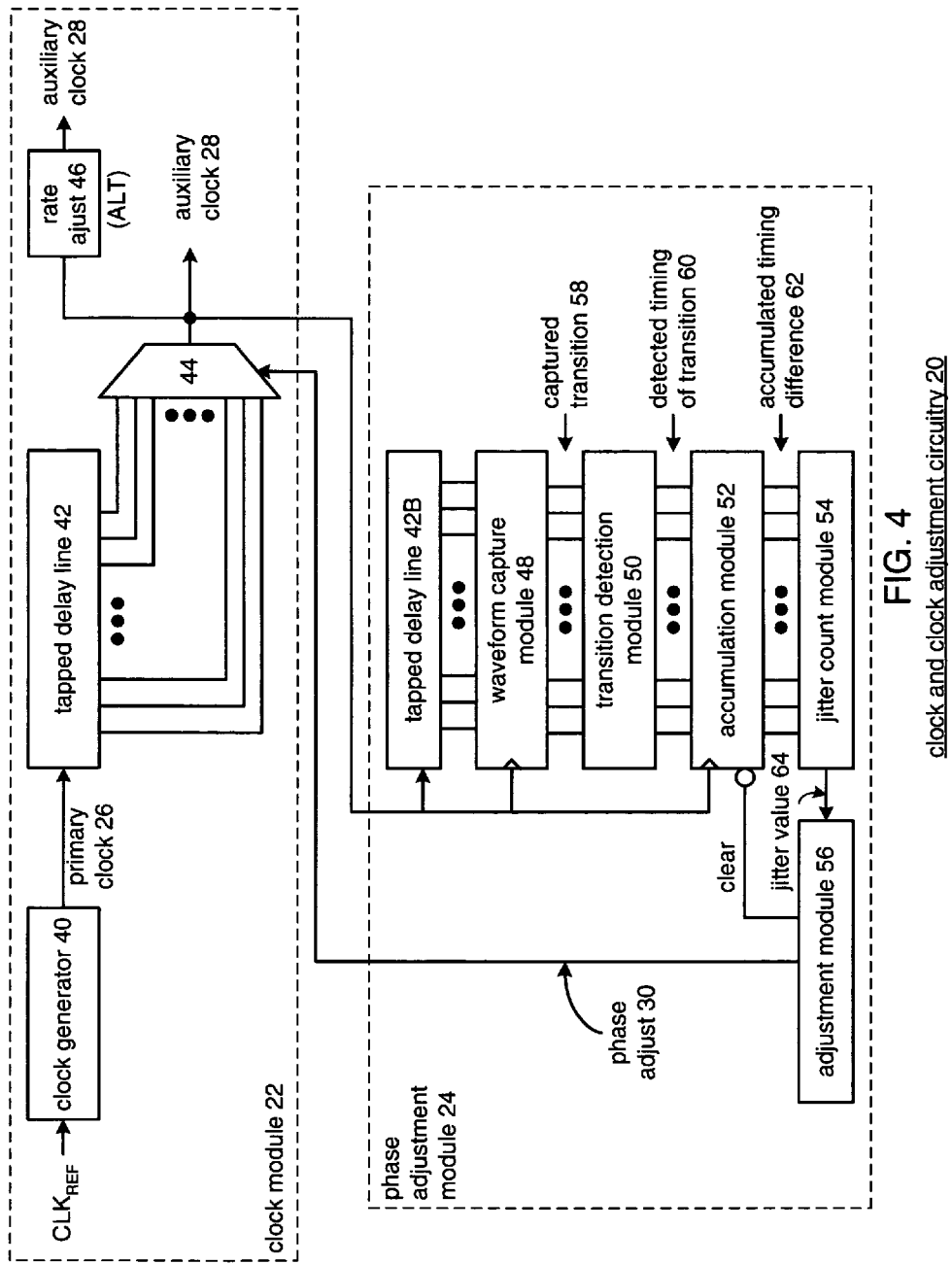
FIG. 4 is a schematic block diagram of another embodiment of a clock and clock adjustment circuit for minimum jitter in accordance with the present invention.

FIG. 4 is a schematic block diagram of another embodiment of the clock and clock adjustment circuitry 20 that includes the clock module 22 and the phase adjust module 24. The clock module 22 includes a clock generator 40, a tapped delay line 42, multiplexer 44 and may optionally include a rate adjust module 46. The phase adjustment module 24 includes a tapped delay line 42B, a waveform capture module 48, a transition detection module 50, an accumulation module 52, a jitter count module 54, and an adjustment module 56.

The clock generator 40, which may be a phase locked loop, crystal oscillator, et cetera, receives a clock reference signal and produces therefrom a primary clock 26. If the clock and clock adjustment circuitry 20 is implemented on an integrated circuit, the primary clock 26 may provide the clock signaling for a plurality of circuits on the integrated circuit.

The tapped delay line 42, which may include a series of buffers/inverters, look-up tables, fast carry logic and/or any other appropriate programmable logic, produces a plurality of delayed representations of the primary clock 26. Typically the tapped delay line 42 is located near clock generator 40 and is designed with a high degree of noise isolation. In other words the delay line is not noise sensitive and consistently generates an accurate representation of the delayed clock input at each of the tap outputs.

For a given phase relationship between the primary clock and the sampling to produce the delayed representations, the delayed representations include delayed representations centered, in time, at the given phase relationship plus and minus a portion of the period of the period of primary clock. For example, if the phase relationship is 0°, the delayed representations will be centered, in time, at a one period delay of the primary clock plus and minus one quarter of the period of the primary clock.

As another example, if the phase relationship is 180°, the delayed representations will be centered, in time, at a one-half period delay of the primary clock plus and minus one quarter of the period of the primary clock. As one of average skill in the art will appreciate, the phase relationship may be incremented from 0° to 360° at any desired interval rate, e.g., every degree.

The tapped delay line 42B, which may include a series of buffers/inverters, look-up tables, fast carry logic and/or any other appropriate programmable logic, produces a plurality of delayed representations of the auxiliary clock 28. Typically the input to the tapped delay line 42B is located near a noise sensitive circuit. Typically the signal input for the delay line has the same input characteristics as the clock input(s) of the noise sensitive circuit. For a given phase relationship between the primary clock and the sampling to produce the delayed representations, the delayed representations include delayed representations centered, in time, at the given phase relationship plus and minus a portion of the period of the period of primary clock.

For example, if the phase relationship is 0°, the delayed representations will be centered, in time, at a one period delay of the primary clock plus and minus one quarter of the period of the primary clock. As another example, if the phase relationship is 180°, the delayed representations will be centered, in time, at a one-half period delay of the primary clock plus and minus one quarter of the period of the primary clock. As one of average skill in the art will appreciate, the phase relationship may be incremented from 0° to 360° at any desired interval rate, e.g., every degree.

The multiplexer 44 receives, as its inputs, at least some of the plurality of delayed representations of the primary clock 26 produced by the tapped delay line 42. The multiplexer 44 selects one of the delayed representations of the primary clock 26 as its output based on the phase adjustment signal 30 provided by the phase adjustment module 24. The output of multiplexer 44 may directly correspond to the auxiliary clock 28. Alternatively, the output of multiplexer 44 may be the input to a rate adjust module 46. The rate adjust module 46 changes the rate of the clock signal outputted by multiplexer 44 by multiplying its rate and/or by dividing its rate to obtain a desired rate of the auxiliary clock 28.

The waveform capture module 48 of the phase adjust module 24 receives at least some of the delayed representations of the primary clock 26 from the tapped delay line 42B. For each incrementing of the phase relationship between the primary clock and the sampling of delayed representations, the waveform capture module 48 receives the phase shifted representations of the primary clock 26, which are centered at the phase relationship. The waveform capture module 48 interprets the received delayed clock signals with respect to the primary clock 26 to determine the phase positioning of the transition of one of the delayed clock signals to produce a captured transition 58. The functionality of the waveform capture module 48 will be described in greater detail with reference to FIGS. 5-8.

The transition detection module 50 receives the captured transition 58 and determines the timing of the transition to produce a detected timing of the transition 60. The functionality of the transition detection module will be described in greater detail with reference to FIGS. 5-8.

The accumulation module 52, on a cycle-by-cycle basis for a given phase relationship, accumulates the timing difference 62 based on the detected timing of transitions 60. The functionality of the accumulation module 52 will be described in greater detail with reference to FIGS. 5-8.

The jitter count module 54 counts, over a plurality of cycles of the primary clock 26, the accumulated timing differences 62 to produce a jitter value 64. The functionality of the jitter count module 54 will be described in greater detail with reference to FIGS. 5-8.

The adjustment module 56 receives the jitter count value 64 for each phase relationship and determines the low noise region of the primary clock 26 from a plurality of jitter count values 64 that have been produced as the phase relationship is adjusted from 0° to 360°, or over some other phase interval (e.g., 0° to 180°, −180° to 180°, −90° to 90°). The adjustment module 56 produces the phase adjust signal 30 based on the low noise region of the primary clock 26. The functionality adjustment module 56 will be described in greater detail with reference to FIGS. 9 and 10.

Figure 5:
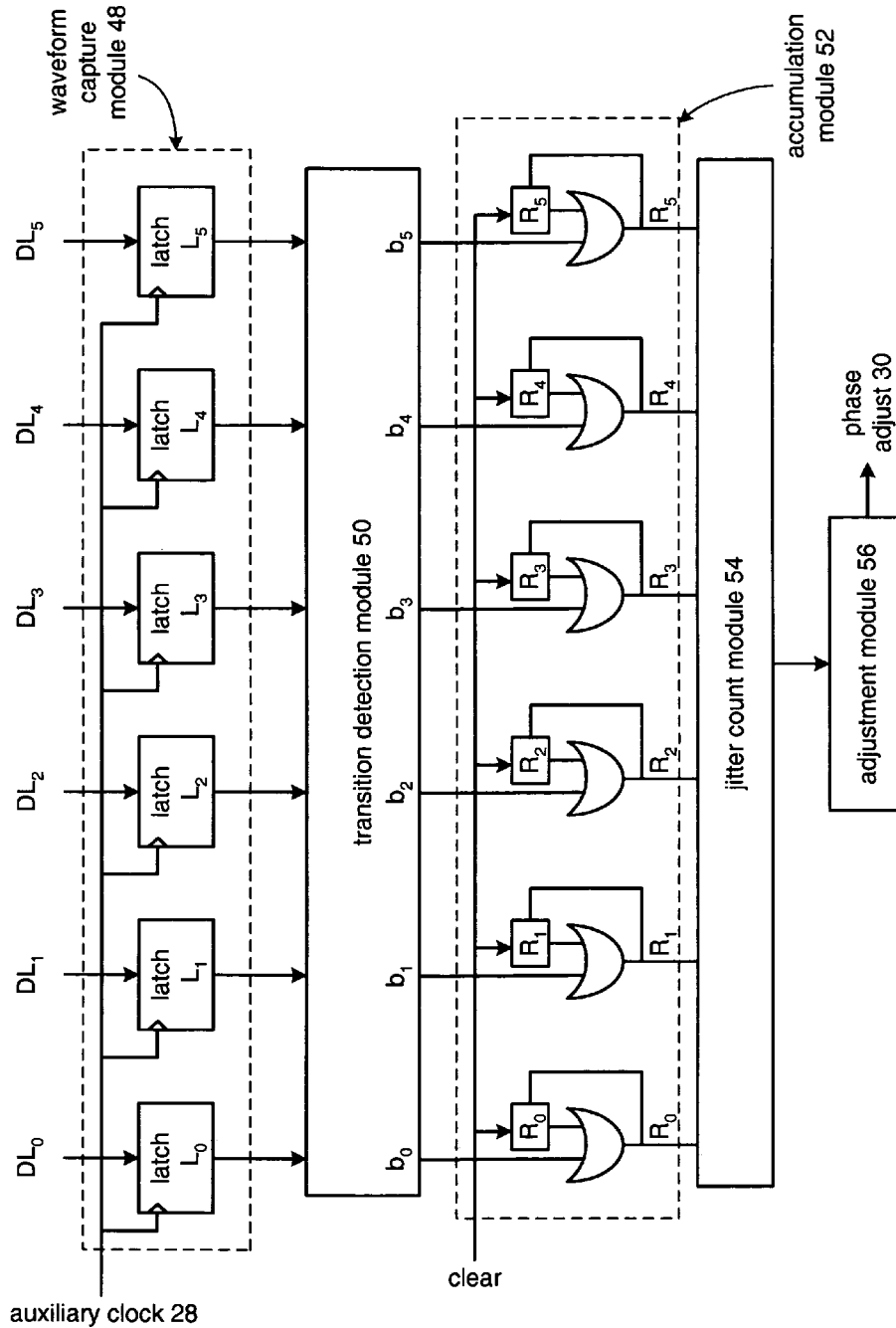
FIG. 5 is a schematic block diagram of a phase adjustment module in accordance with the present invention.

FIG. 5 is a schematic block diagram of an embodiment of the phase adjust module 24 that includes the waveform capture module 48, the transition detection module 50, the accumulation module 52, the jitter count module 54 and the adjustment module 56. The waveform capture module 48 may include a plurality of latches (L0-L5) that each receives a corresponding delay line output from tapped delay line 42B (DL0-DL5). The latches are clocked from the rising, or falling, edge of the auxiliary clock 28. The functionality of waveform capture module 48 will be described in greater detail with reference to FIGS. 6-8.

The transition detection module 50 receives the latched signals L0-L5 and produces a corresponding detected timing of the transition 60 which, for this example includes 6 bits b0-b5. The functionality of the transition detection module 50 will be described in greater detail with reference to FIGS. 6-8.

The accumulation module 52 includes a plurality of OR gates and a corresponding plurality of registers (R0-R5). The OR gates provide an OR function of the current output of the transition detection module 50 with a previous output of the transition detection module 50 on a bit by bit basis. The corresponding outputs are, for this example, R0-R5. Note that registers R0-R5 may be cleared by the adjustment module 56. The functionality of the accumulation module 52 will be described in greater detail with reference to FIGS. 6-8.

The jitter count module 54 receives the accumulated timing differences 62 for each cycle of the primary clock 26 to produce the corresponding jitter count 64. The functionality of the jitter count module 54 will be described in greater detail with reference to FIGS. 6-8.

Figure 6:
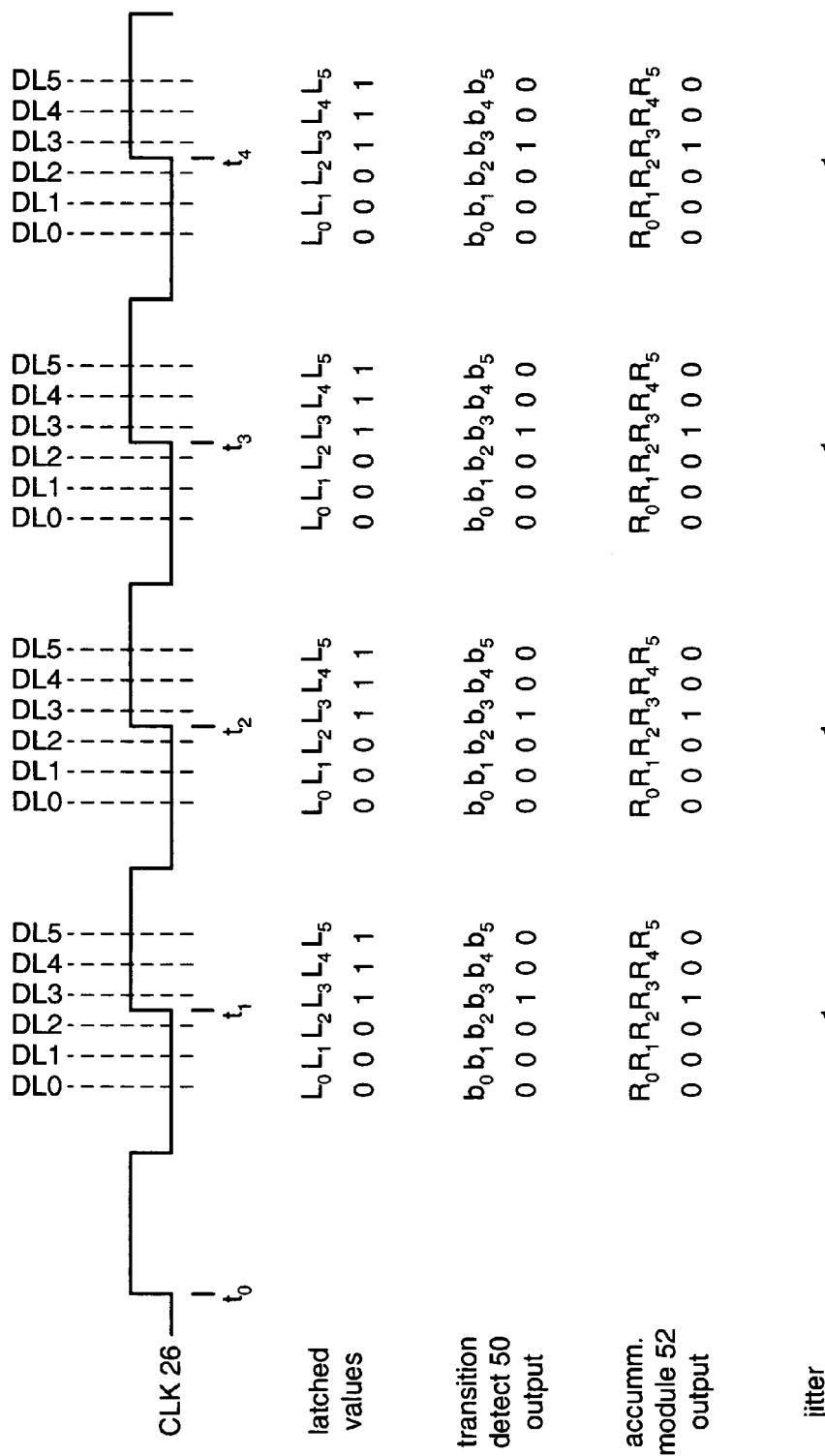
FIG. 6 is a diagram representing an example operation of the phase adjustment module for a zero phase position when no jitter is present in accordance with the present invention.

FIG. 6 illustrates an example of the operation of the phase adjust module 24 for a 0° phase positioning, or relationship, and no jitter being present. The 0° phase positioning corresponds to the delayed representations of the primary clock being centered at an ideal one period delay of the primary clock 26. In this illustration, six delayed representations of the primary clock 26 (DL0-DL5) are shown centered at one period intervals of the primary clock 26. As such, for time t1, six delayed representations will be produced in accordance with the example of FIG. 5. Similarly, at time t2 of primary clock 26, six delayed representations are produced. The same is true for time periods t3 and t4. As one of average skill in the art will appreciate, more or less than six delayed representations of the primary clock 26 may be produced.

The latches, at time period t1, latch the corresponding values of the delay lines DL0-DL5. In this instance, the first 3 latches L0-L2 latch a 0 since the transition of the clock has not occurred and latches L3-L5 latch a 1 since they occur after the transition of the primary clock 26 at time t1. Similarly, for times t2, t3 and t4 latches L0-L2 latch a logic 0 while latches L3-L5 latch a logic 1.

The transition detection module 50 determines when the series of latch values transition from a 0 to a 1. When that transition is detected, the corresponding bit location of that transition is indicated by a logic 1. All other bits are 0 with respect to the output of transition detect module 50. In this example, the transition at each time interval t1, t2, t3 and t4, the transition occurs between bits 2 and 3 (i.e., between latches 2 and 3) to produce the transition detect module output 50 having a logic value of 000100.

The accumulation module 52 counts the bit width between the first and last occurrence of a logic 1 in the output of the transition detection module 50 and updates the count every time interval to produce the jitter count value 64. In this example, since no jitter is present, the transition occurs at the same bit position thus, the width of variation is 1. Accordingly, the jitter value 64 is a 1. With a jitter value of 1, the adjustment module 56 interprets the 1 to indicate that minimal jitter is present thus; the corresponding phase relationship of the auxiliary clock to the primary clock produces a low level of noise.

Figure 7:
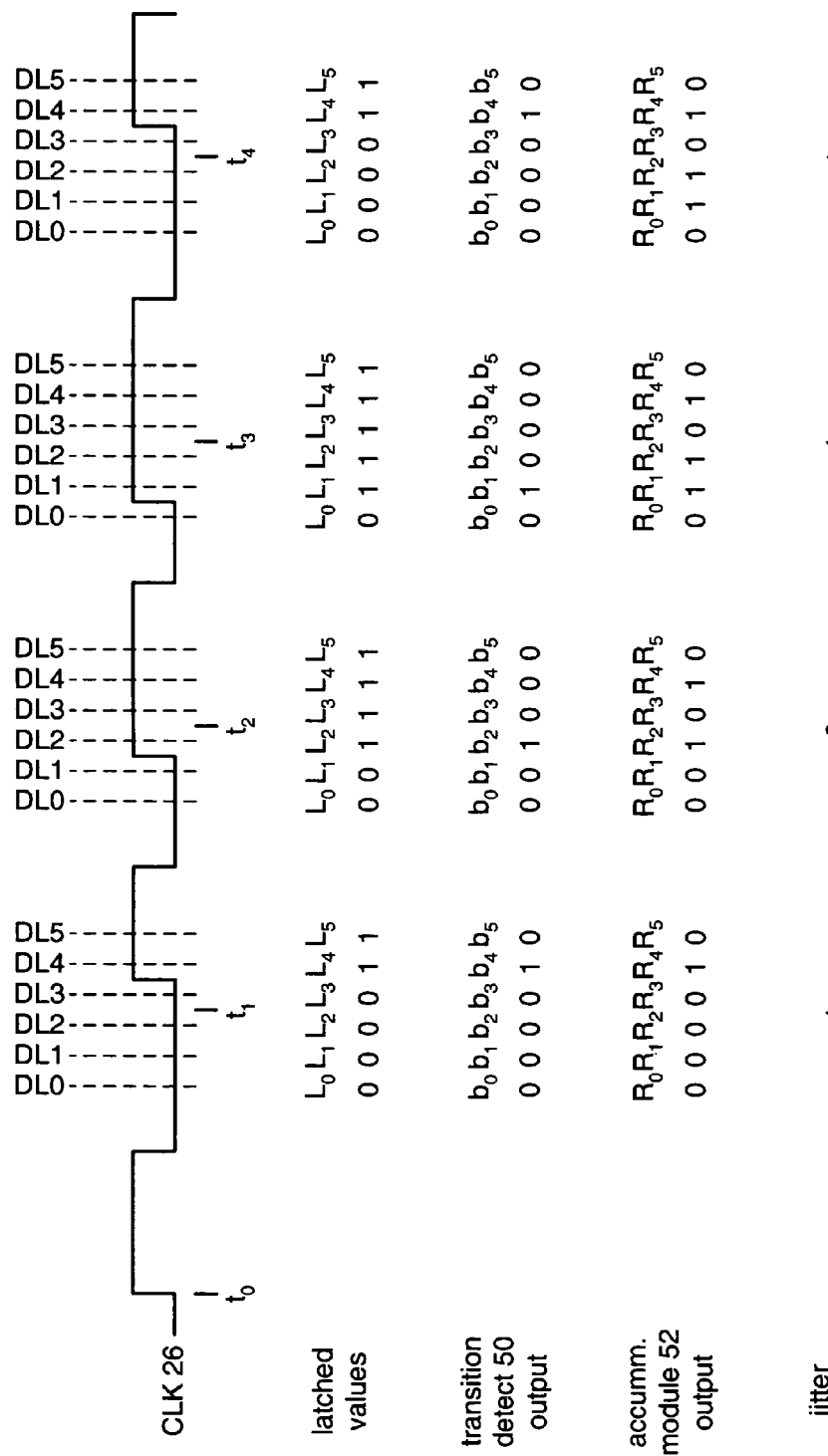
FIG. 7 is a diagram representing the operation of the phase adjust module for a zero phase position when jitter is present in accordance with the present invention.

FIG. 7 illustrates the operation of the phase adjust module 24 for a 0° phase relationship when jitter is present. In this example, the primary clock 26 experiences jitter such that the transition of the clock does not always occur at times t1, t2, t3 and t4 as desired. Prior to time t0, accumulation module 52 registers R0-R5 are initialized to zero by adjustment module 56. In this example, the primary clock 26 experiences jitter such that the transition of the clock does not occur at times t1, t2, t3 and t4. In this example, at time t1, the transition occurs between DL3 and DL4 of the corresponding delay lines. As such, the latches latch-in the value of 000011. From this digital value, the transition detection module 50 outputs a logic value of 000010, indicating that the bit transition took place between L3 and L4. The accumulation module 52 outputs a corresponding value of 000010 which corresponds to the ORing of the output transition detection module 50 with a previous output. Since this is the initial value, the output of the accumulation module 52 corresponds to the transition detection module output 50. The jitter count value 64 is updated to count the various positions in which the transition is detected. At this instance, the jitter count value is 1.

At time t2, the transition of the primary clock 26 occurs between delay line 1 and delay line 2. Accordingly, the latches latch-in the value of 001111. The transition detection module 50 determines that the transition occurs between latches L1 and L2 and produces a corresponding output of 001000. This value is ORed with the previous output of the accumulation module 52 to produce a current accumulation module output of 001010. The jitter count module counts the number of bits between the first occurrence of a logic 1 and the last occurrence of a logic 1. At time t2, there are 3 bits variation in the occurrence of the transition edge. As such, the jitter count 64 is 3.

At time t3, the transition of primary clock 26 occurs between DL0 and DL1. Accordingly, latches latch-in the value of 011111. The transition detection module 50 interprets the latches to produce a digital value of 010000. The accumulation module 52 OR's the current transition detection output with the previous accumulated module output to produce a current accumulated module output of 011010. The jitter count module counts the number of bits between the first occurrence and last occurrence of a 1 in the accumulation module 52 output, which in this example is 4.

At time t4, the transition of the primary clock 26 occurs between DL3 and DL4. The latches latch-in the value of 00011. The transition detection module 50 interprets this and produces a corresponding output of 000010. This value is ORed with the previous output of the accumulation module 52 to produce a current output of the accumulation module 52 that, for this example, is 011010. The jitter count module counts the number of bits between the first occurrence and last occurrence of 1's in the accumulation module output and, for this example, is 4. In this example and for this particular phase positioning, the number of cycles of the primary clock is four, thus, the resulting jitter count value is 4. The jitter count module stores this value with respect to this phase relationship, i.e., positioning, and the process is repeated for a different phase relationship.

Figure 8:
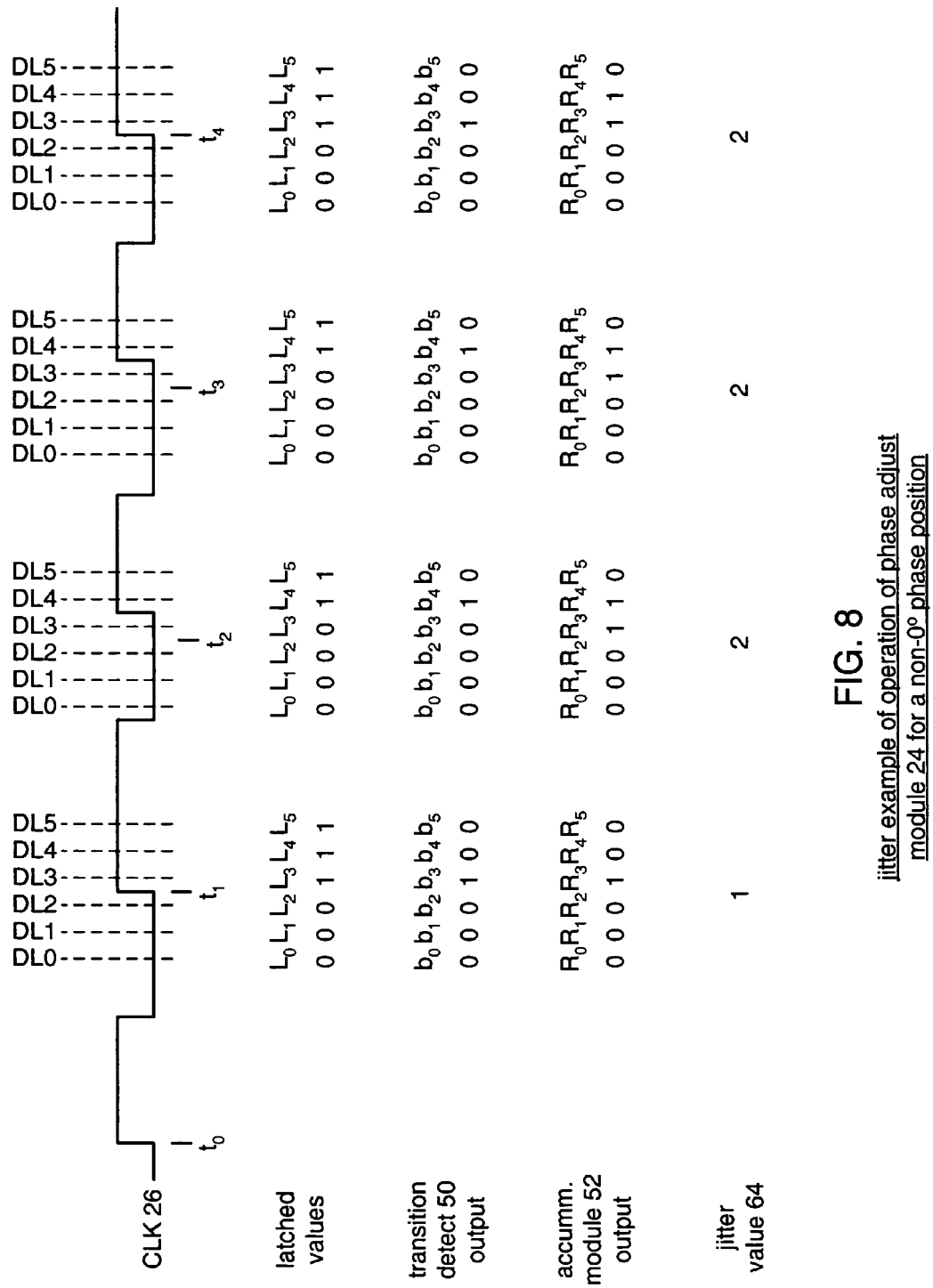
FIG. 8 is a diagram of the operation of the phase adjust module for a non-zero phase position when jitter is present in accordance with the present invention.

FIG. 8 is a diagram of the operation of the phase adjust module 24 for a non-zero phase positioning where jitter is present. In this example, the input from the delay line has the phase positioning as shown. Prior to time t0, accumulation module 52 registers R0-R5 are initialized to zero by adjustment module 56. At time interval t1, the transition of the primary clock 26 occurs between the relative position of D2 and D3. Accordingly, the latches latch-in the value of 000111. The transition detection module 50 produces an output of 000100, which corresponds to the transition occurring between latches 2 and 3. The accumulation module output 52 ORs the previous value of 0 with the current transition detection module 50 output to produce a logic value of 000100. From this value, the jitter count module determines the bits between the first and last occurrence of 1's in the accumulation module 52 output, which at time t1 is 1.

At time interval t2, the transition of the primary clock 26 occurs between the relative position of D3 and D4. Accordingly, the latches latch-in the value of 000011. The transition detection module 50 produces an output of 000010, which corresponds to the transition occurring between latches 3 and 4. The accumulation module output 52 ORs the previous value of 0 with the current transition detection module 50 output to produce a logic value of 000110. From this value, the jitter count module determines the bits between the first and last occurrence of 1's in the accumulation module 52 output, which at time t2 is 2.

At time t3, the transition again occurs between DL3 and DL4. Accordingly, similar outputs from the transition detection module 50 and accumulation module 52 are produced like time t2. The jitter count value 64 remains at 2 at time t3. At time t4, the transition of primary clock 26 occurs between the DL2 and DL3 as it did for time t1. Accordingly, similar output from the transition detection module 50 is produced as 00100 as in time t1. The jitter count value 64 remains at 2.

By comparing the examples of FIGS. 7 and 8, the non-zero phase positioning of FIG. 8 has a lower jitter count value than the 0 phase positioning of FIG. 7. Thus, if these were the only two samplings taken, by producing a phase positioning for the auxiliary clock to occur matching the non-zero phase positioning used for FIG. 8, the jitter experienced by a circuit would be less in FIG. 8 than in FIG. 7. As one of average skill in the art will appreciate, the non-zero phase positioning may occur at any degree of phases. For example, the non-zero phase positioning may be every degree from 0°-360°, every 5°, every 10°, et cetera.

Figure 9:
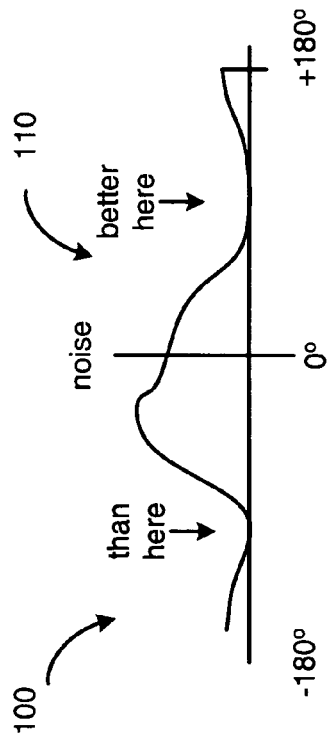
FIG. 9 is a table representing the operation of the adjust module functionality in accordance with the present invention.

As the phase is shifted from 0° to 360°, the adjustment module 56 tabulates the corresponding jitter count as shown in FIG. 9. In this example, at phase shift 0, the jitter value is 4. For phase degrees 1 and 2, the jitter value was also 4. The table continues for values up to 359° phase shift which has a corresponding jitter value of 4. At some phase offset (y°), the jitter value is 1. In this example, the jitter value 1 is the lowest in the table. As such, phase offset y would be selected for the phase adjust signal 30 that is provided to the multiplexer 44 to provide the selected timing for the auxiliary clock.

Figure 10:
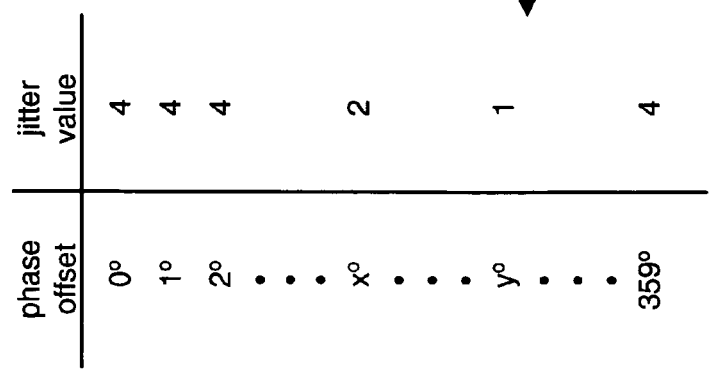
FIG. 10 is a graph depicting a noise profile as determined in accordance with the present invention.

The adjustment module 56 may store the jitter values 64 in an N-by-M matrix to produce a noise profile as shown in FIG. 10. In this example, the noise varies over a 360° sweep of the phase relationship. As shown, there are two occurrences where the noise is relatively low. However, on the left portion 100 the area of low noise is smaller than on the right portion 110. Thus, it would be advantageous to select the phase relationship with the broadest low noise area to minimize the interference, e.g., the right portion 110.

As one of average skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a low noise clock circuit and method thereof. By aligning a clock signal that is used for noise sensitive circuits to have transitions that occur during low noise portions of the primary clock, jitter in the noise sensitive clock and noise sensitive circuitry is reduced. As one of average skill in the art will appreciate, other embodiments may be derived from the teaching of the present invention without deviating from the scope of the claims.

What is claimed is:

1. A method for adjusting a clock for a jitter sensitive circuit, the method comprises:
    determining a plurality of jitter values between a primary clock and an auxiliary clock derived from the primary clock as a phase relationship of the primary clock and the auxiliary clock is adjusted;
    determining a low noise phase region of the primary clock with respect to the auxiliary clock based on the plurality of jitter values; and
    adjusting phase of the auxiliary clock such that a transition of the auxiliary clock falls within the low noise phase region of the primary clock to produce an adjusted auxiliary clock by performing steps including:
        determining a jitter value of the primary clock with respect to a plurality of phase positions of the auxiliary clock;
        comparing the jitter values of the plurality of phase positions;
        identifying at least one of the plurality of phase positions based on the comparing; and
        adjusting the phase of the auxiliary clock based on the at least one of the plurality of phase positions.

2. The method of claim 1 further comprises:
    synchronizing the auxiliary clock with the primary clock.

3. The method of claim 1, wherein the determining the jitter value comprises:
    comparing a one-cycle transition of the primary clock with a plurality of delayed representations of the primary clock;
    generating a relative transition indication based on the comparing of the one-cycle transition with the plurality of delayed representations of the primary clock; and
    accumulating the relative transition indications over a number of cycles of the primary clock to produce the jitter value.

4. The method of claim 3, wherein the one-cycle transition of the primary clock comprises at least one of:
a rising edge; or
a falling edge.

5. The method of claim 3, wherein the accumulating the relative transition indications comprises:
profiling noise of the primary clock based on the accumulating of the relative transition indications.

6. The method of claim 1 comprises at least one of:
performing the determining and the adjusting phase on a periodic basis; or
performing the determining and the adjusting phase in accordance with a performance trigger.

7. A low noise clock circuit comprises:
a clock module that produces a primary clock and an auxiliary clock derived from the primary clock; and
phase adjustment module operably coupled to:
determine jitter values of the primary clock with respect to a plurality of phase positions of the auxiliary clock;
compare the jitter values of the plurality of phase positions;
identify at least one of the plurality of phase positions based on the comparison, the at least one of the plurality of phase positions being a low noise phase region of the primary clock with respect to the auxiliary clock; and
adjust phase of the auxiliary clock based on the at least one of the plurality of phase positions and such that a transition of the auxiliary clock falls within the low noise phase region of the primary clock to produce an adjusted auxiliary clock.

8. The low noise clock circuit of claim 7 further comprises at least one of:
the auxiliary clock being a synchronized and delayed representation of the primary clock;
the auxiliary clock being synchronized to the primary clock and having a rate that is a fraction of the rate of the delayed representation of the primary clock; or
the auxiliary clock being synchronized to the primary clock and having a rate that is a multiple of the rate of the delayed representation of the primary clock.

9. The low noise clock circuit of claim 7, wherein the phase adjustment module comprises:
a waveform capture module operably coupled to capture a transition of the primary clock with to respect to a plurality of phase positions of the auxiliary clock;
transition detection module operably coupled to detect timing of the transition of the primary clock from cycle to cycle of the primary clock for a given one of the plurality of phase positions of the auxiliary clock to produce a detected timing of transition;
accumulation module operably coupled to accumulate the detected timing of the transition to produce an accumulated timing difference;
jitter count module operably coupled to count the accumulated timing differences to produce a jitter value for the given one of the plurality of phase positions of the auxiliary clock; and
adjustment module operably coupled to determine a phase adjustment for the auxiliary clock based on the jitter values for each of the plurality of phase positions of the auxiliary clock.

10. The low noise clock circuit of claim 9, wherein the waveform capture module comprises:
a plurality of latches clocked via the primary clock, wherein on a edge of the primary clock, each of the plurality of latches stores a corresponding delayed representation of the primary clock.

11. The low noise clock circuit of claim 10, wherein the accumulation module comprises:
a plurality of OR gates, wherein each of the plurality of OR gates is operably coupled to OR a current detecting timing interval of the detected timing with a previous detected timing interval of the detected timing.

12. The low noise clock circuit of claim 9, wherein the transition of the primary clock comprises at least one of:
a rising edge; or
a falling edge.

13. The low noise clock circuit of claim 9, wherein the accumulation module comprises:
an N×M bit memory for storing the accumulated timing difference for each of the plurality of phase positions of the auxiliary clock such that noise of the primary clock is profiled.

14. An integrated circuit comprising:
programmable logic fabric;
memory operably coupled to the programmable logic fabric;
an input/output section operably coupled to:
receive input data from outside of the programmable logic device;
provide the input data to at least one of the programmable logic fabric and the memory;
receive output data from the at least one of the programmable logic fabric and the memory; and
provide the output data to the outside of the programmable logic device;
a low noise clock circuit operably coupled to at least one of the input/output section and the programmable logic fabric, wherein the low noise clock circuit includes:
a clock module that produces a primary clock and an auxiliary clock derived from the primary clock; and
phase adjustment module operably coupled to:
determine a low noise phase region of the primary clock with respect to the auxiliary clock; and
adjust phase of the auxiliary clock such that a transition of the auxiliary clock falls within the low noise phase region of the primary clock to produce an adjusted auxiliary clock.

15. The integrated circuit of claim 14 further comprises at least one of:
the auxiliary clock being a synchronized and delayed representation of the primary clock;
the auxiliary clock being synchronized to the primary clock and having a rate that is a fraction of the rate of the delayed representation of the primary clock; or
the auxiliary clock being synchronized to the primary clock and having a rate that is a multiple of the rate of the delayed representation of the primary clock.

16. The integrated circuit of claim 14, wherein the phase adjustment module comprises:
a waveform capture module operably coupled to capture a transition of the primary clock with to respect to a plurality of phase positions of the auxiliary clock;
transition detection module operably coupled to detect timing of the transition of the primary clock from cycle to cycle of the primary clock for a given one of the plurality of phase positions of the auxiliary clock to produce a detected timing of transition;
accumulation module operably coupled to accumulate the detected timing of the transition to produce an accumulated timing difference;

jitter count module operably coupled to count the accumulated timing differences to produce a jitter value for the given one of the plurality of phase positions of the auxiliary clock; and adjustment module operably coupled to determine a phase adjustment for the auxiliary clock based on the jitter values for each of the plurality of phase positions of the auxiliary clock.

17. The integrated circuit of claim 16, wherein the waveform capture module comprises:

a plurality of latches clocked via the primary clock, wherein on a edge of the primary clock, each of the plurality of latches stores a corresponding delayed representation of the primary clock.

18. The integrated circuit of claim 17, wherein the accumulation module comprises:

a plurality of OR gates, wherein each of the plurality of OR gates is operably coupled to OR a current detecting timing interval of the detected timing with a previous detected timing interval of the detected timing.

19. The integrated circuit of claim 16, wherein the transition of the primary clock comprises at least one of:

a rising edge; or a falling edge.

20. The integrated circuit of claim 16, wherein the accumulation module comprises:

an N×M bit memory for storing the accumulated timing difference for each of the plurality of phase positions of the auxiliary clock such that noise of the primary clock is profiled.

21. The integrated circuit of claim 14, wherein the phase adjustment module is implemented within the programmable logic fabric.

22. The integrated circuit of claim 14, wherein the input/output section comprises:

a digital clock manager module that includes the low noise clock circuit.

* * * * *